United States Patent [19]
Williams

[11] 3,872,371
[45] Mar. 18, 1975

[54] POWER CONTROL SYSTEM

[76] Inventor: Albert M. Williams, Box 25262, Los Angeles, Calif. 90025

[22] Filed: Jan. 28, 1974

[21] Appl. No.: 437,269

[52] U.S. Cl.................. 321/16, 307/36, 307/38, 307/41
[51] Int. Cl. ............................................ H02m 7/00
[58] Field of Search .......... 307/36, 37, 38, 41, 157; 321/16

[56] References Cited
UNITED STATES PATENTS
3,365,649   1/1968   Shaw........................................ 321/16
3,529,173   9/1970   Verma....................................... 307/41

*Primary Examiner*—R. N. Envall, Jr.
*Attorney, Agent, or Firm*—Harvey S. Hertz

[57] ABSTRACT

A power control system having a range power control and a power distribution control circuit cascaded with the range power control. The power distribution control circuit distributes power from the range power control to a plurality of loads equal to a predetermined value. The range power control comprises a full wave bridge rectifier having a pair of fixed diodes and pair of silicon controlled rectifiers. The bridge circuit provides phase controlled full wave rectified power output. The power distribution control includes an independent section and a dependent section, each section having a load. Changes in power output of the independent section load in turn varies the power output of the dependent section load resulting in a constant power distribution between the loads. A delay network is used to couple the independent section to the dependent section.

3 Claims, 3 Drawing Figures

POWER CONTROL SYSTEM

BACKGROUND OF THE INVENTION

1. Field of art

The field of art to which the invention pertains includes the field of power control systems, particularly with respect to a control system for varying the amount of power through a pair of loads with the resultant output power between the pair of loads remaining relatively constant.

2. Background of the Invention

In U.S. Pat. application Ser. No. 350,851, filed Apr. 13, 1973, there is described a lighting control system for varying the intensity of a light source as well as the hue of the light. A pair of photoconductive cells, each of which are sensitive to wavelength bands having color complements of each other and produce white light when combined. An electrical circuit is provided so that the intensity as well as the hue of the light source can be compensated for. The circuit requires a relatively complex technique for balancing the color sources which produce the different hues.

In order to overcome the attendent disadvantages of the prior art power intensity and color hue correction system, the present invention provides a range control circuit for varying the power output of a circuit which could be used to control the intensity of a light source. Additionally, a pair of independent loads are controlled for providing a balanced power output equal to a predetermined value with a variation on one of the loads controlling the amount of power at the other load.

SUMMARY OF THE INVENTION

Particularly, the invention comprises a power control system having a range power control and a power distribution control circuit cascaded therewith. The power distribution control distributes the power which is equal to a predetermined value from the range power control to a plurality of loads.

The advantage of the invention, both as to its construction and mode of operation, will be readily appreciated as the same becomes better understood by reference to the following detailed description when considered in connection with the accompanying drawings.

DESCRIPTION OF THE PREFERRED EMBODIMENTS

Figure 1:
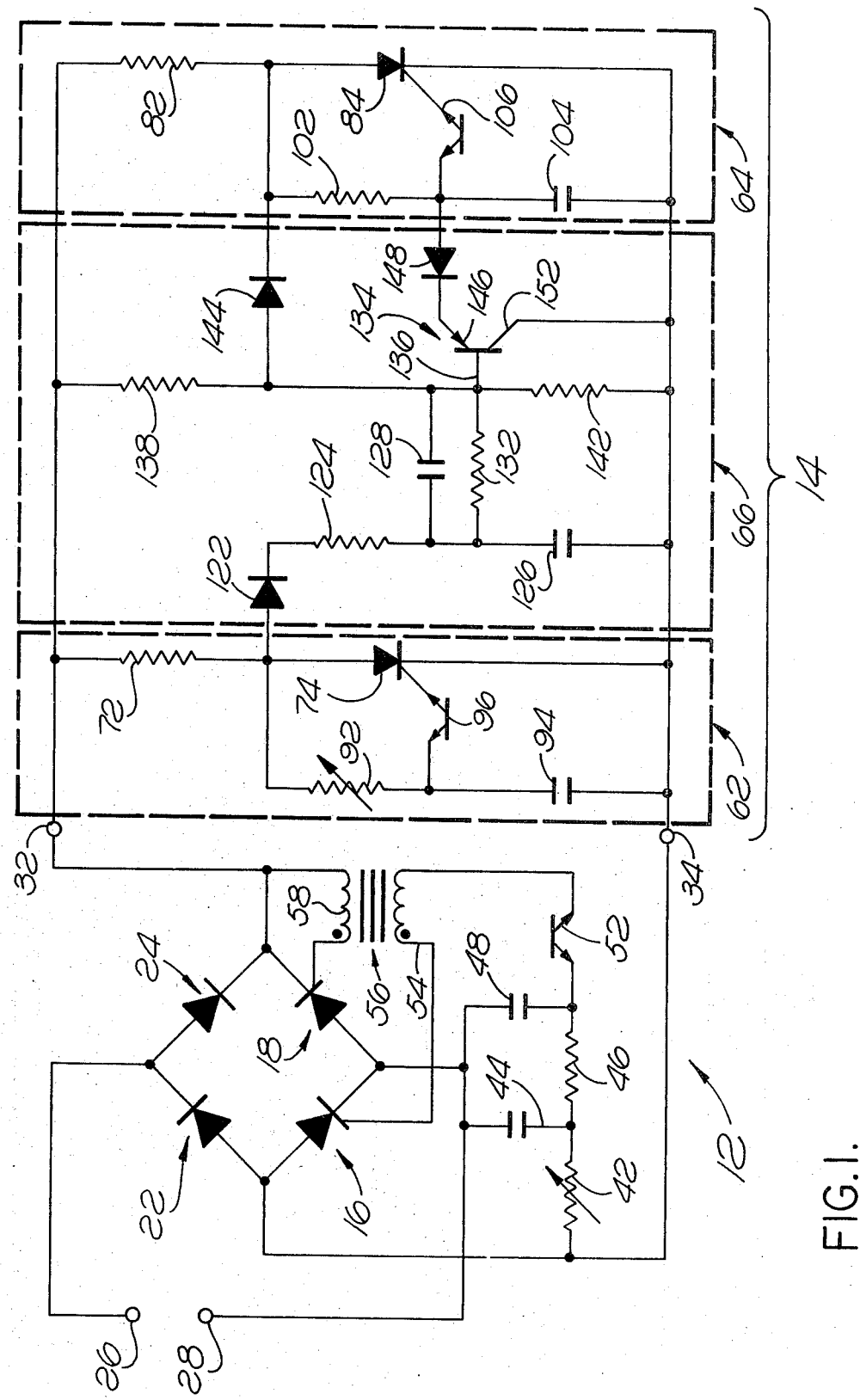
FIG. 1 is a circuit diagram of the power control system.

Referring now to FIG. 1, there is shown a preferred embodiment of the circuit used to form the power control system and made in accordance with principles of the invention. The power control system comprises a primary control circuit 12 which is in the form of a full-wave bridge rectifier and which is used to control the power available to an ancillary circuit 14. The primary control circuit 12 comprises a first bridge silicon controlled rectifier 16 and a second bridge silicon controlled rectifier 18. A first bridge diode 22 and a second bridge diode 24 complete the four legs of the full wave bridge rectifier. Input AC voltage is applied to a pair of input terminals 26, 28 of the power supply primary circuit 12. The terminal 26 is connected to the junction of the first bridge diode 22 and the anode of the second bridge diode 24. The AC input terminal 28 is connected to the cathode of the first bridge silicon controlled rectifier 16 and the anode of the second bridge silicon controlled rectifier 18.

The junction of the cathode of the second bridge diode 24 and the cathode of the second bridge silicon controlled rectifier 18 are connected to the power supply first output terminal 32. The junction of the anode of the first bridge diode 22 and the anode of the first bridge silicon controlled rectifier 16 are connected to the second power supply output terminal 34. The power supply 12 provides a full wave rectified power output at conduction angles varying between 5 and 180 degrees. The angle variation is controlled by controlling the firing of the first and second bridge silicon controlled rectifiers 16 and 18. During alternate half cycles of the AC input voltage across the input terminals 26 and 28, the diode 24 and first bridge silicon controlled rectifier 16 conduct. During the other alternate half cycles, the first bridge diode 22 and the second bridge silicon controlled rectifier 18 conduct. To control the conduction angle during these half cycles, an RC circuit is used to control the firing of the SCR's. A variable resistor 42 is connected between the terminal 34 and one side of a first capacitor 44. The other side of the capacitor is connected to the junction of the cathode of the first bridge circuit SCR 16 and the anode of the diode 18. A fixed resistor 46 is connected between the junction of the variable resistor 42 and the first capacitor 44 to one side of a second capacitor 48. The other side of the capacitor 48 is connected to the other side of the first capacitor 44. In addition, the junction of the fixed resistor 46 and the capacitor 48 are connected to one side of the Diac 52. The other side of the Diac 52 is connected to one side of the primary winding 54 of a transformer 56. The other side of the primary winding 54 is connected to the gate of the first bridge SCR 16. The secondary winding 58 of the transformer is connected between the terminal 32 and the gate of the second bridge circuit SCR 18.

Figure 2:
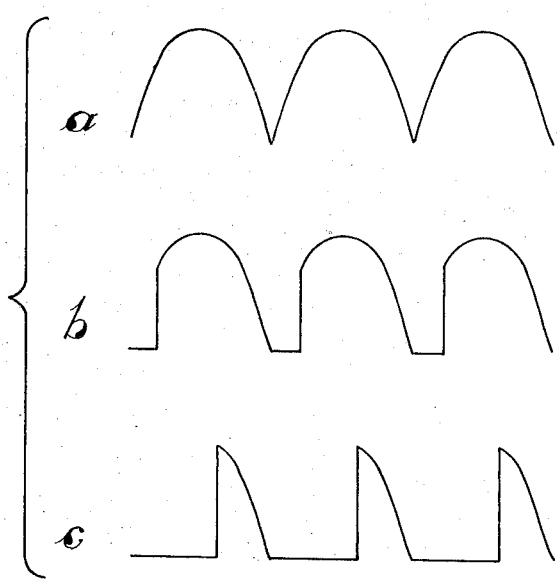
FIGS. 2(a-c) are waveforms of voltages at various points in the circuit of FIG. 1.

The firing of the first bridge circuit SCR 16 and the second bridge circuit SCR 18 is controlled by adjustment of the variable resistor 42 which controls the RC time constant of the circuit formed by the variable and fixed resistors 42 and 46 capacitors and the first and second capacitors 44 and 48. The Diac 52 is used to fire each of the SCR's 16 and 18 as is conventional. The rectified DC output voltage from the power supply 12 is connected across the output terminals 32 and 34. The output voltage waveform across the terminals is illustrated in FIG. 2(a) as a full wave rectified output. Of course, other than a full wave rectified output can be provided by varying the firing of the SCR's 16 and 18.

The ancillary circuit 14 comprises an independent load section 62 and a dependent load section 64 which are interconnected by means of a delay network 66.

Current through a first load, illustrated as a resistor 72, is controlled by means of firing of a first load SCR 74 which is connected in series with the resistor 72 across the terminals 32 and 34. A second load, illustrated as a resistor 82, is connected in series with a second load SCR 84 which is also connected across the terminals 32 and 34 in a series configuration. A first variable resistor 92 is connected to the junction of the resistor 72 and the anode of the first load SCR 74. A charging capacitor is connected between the other side of the variable resistor 92 and the terminal 34. A Diac 96 is connected between the junction of the resistor 92 and the capacitor 94 and the gate of the first load SCR 74. The dependent load section 64 is of similar configuration as the independent load section. The dependent load section comprises a resistor 102 connected between the junction of the resistor 82 and the anode of the second load SCR 84, and one side of a filter capacitor 104. The other side of the filter capacitor 104 is connected to the terminal 34. A second Diac 106 is connected between the junction of the resistor 102 and the filter capacitor 104, and the gate of the silicon controlled rectifier 84.

The delay network 66 comprises a peak detection diode 122 whose anode is connected between the junction of the resistor 72 and anode of the first load silicon controlled rectifier 74 and whose cathode is connected to one side of a resistor 124. The other side of the resistor is connected to one side of a capacitor 126, the other side of the capacitor being connected to the terminal 34. The resistor 124 and capacitor 126 form a basic delay integrator circuit. A differentiating circuit is connected between the junction of the resistor 124 and capacitor 126 and is formed of a parallel-connected capacitor 128 and resistor 132. The other side of the capacitor 128 and 132 is joined to a transistor 134 at its base 136. A biasing network for the transistor 134 is formed of a first biasing resistor 138 which is connected between the terminal 32 and the base 136 and a second biasing resistor 142 which is connected between the base 136 and the terminal 34. A steering diode 144 has its anode connected to the base 136 of the transistor 134 and its cathode connected to the anode of the second load silicon controlled rectifier 84. The emitter 146 of the transistor 134 is connected to the cathode of a second steering diode 148 whose anode is connected to the junction of the resistor 102 and capacitor 104. Further, the collector 152 of the transistor 134 is connected to the terminal 34.

The rectified DC voltage across the terminals 32 and 34 is used to fire the first load SCR 74. The variable resistor 92 is adjusted to provide a desired R-C time constant for the charging circuit formed by the resistor 92 and capacitor 94. When the capacitor 94 charges to a sufficient value, the SCR 74 fires and a load current flows through the first load resistor 72. This firing of the first load SCR 74 is used to control the second load SCR 84 conduction. However, the second load SCR 84 is not used to control the firing of the first load SCR 74.

The delay network 66 is then used to determine when the second load SCR 84 will fire. It should be noted that the firing of the second load SCR 84 is not controlled by the capacitor 104. The resistor 124 and capacitor 126 form a basic delay integrating circuit. The capacitor 128 and the resistor 132 form a basic differentiating circuit. Voltage phase retardation occurs within the integrating circuit while voltage phase advancement occurs within the differentiating circuit in order to obtain appropriate delay and magnitude of the control voltage, that is, a voltage at the gate of the SCR 84.

The differentiating and integrating circuits control the voltage at the base 136 of the transistor 134. This rate of rise determines the conduction angle of the second load SCR 84. As the voltage at the base 136 rises, the voltage at the junction of the resistor 102 and capacitor 104 decreases until the voltage at this junction is sufficient to fire the second load SCR 84. When the second load SCR 84 fires, current flows through the second load resistor 82. At this time the first load SCR 74 may still be conductive as the conduction of the second load SCR 84 does not control the conduction of the first load SCR 74. When the first load SCR 74 is no longer conductive, the diode 122 starts to conduct, thus, initiating a new charging cycle for the differentiating and integrating circuits formed by the resistor 124 and capacitor 126 as well as the capacitor 128 and resistor 132. As illustrated in FIGS. 2(b), the voltage waveform across the first load resistor is controlled by the conduction of the first load SCR 74. The voltage across the second load resistor 82 is controlled by the firing of the second load SCR 84 with the waveform thereof being shown in FIG. 2(c).

Figure 3:
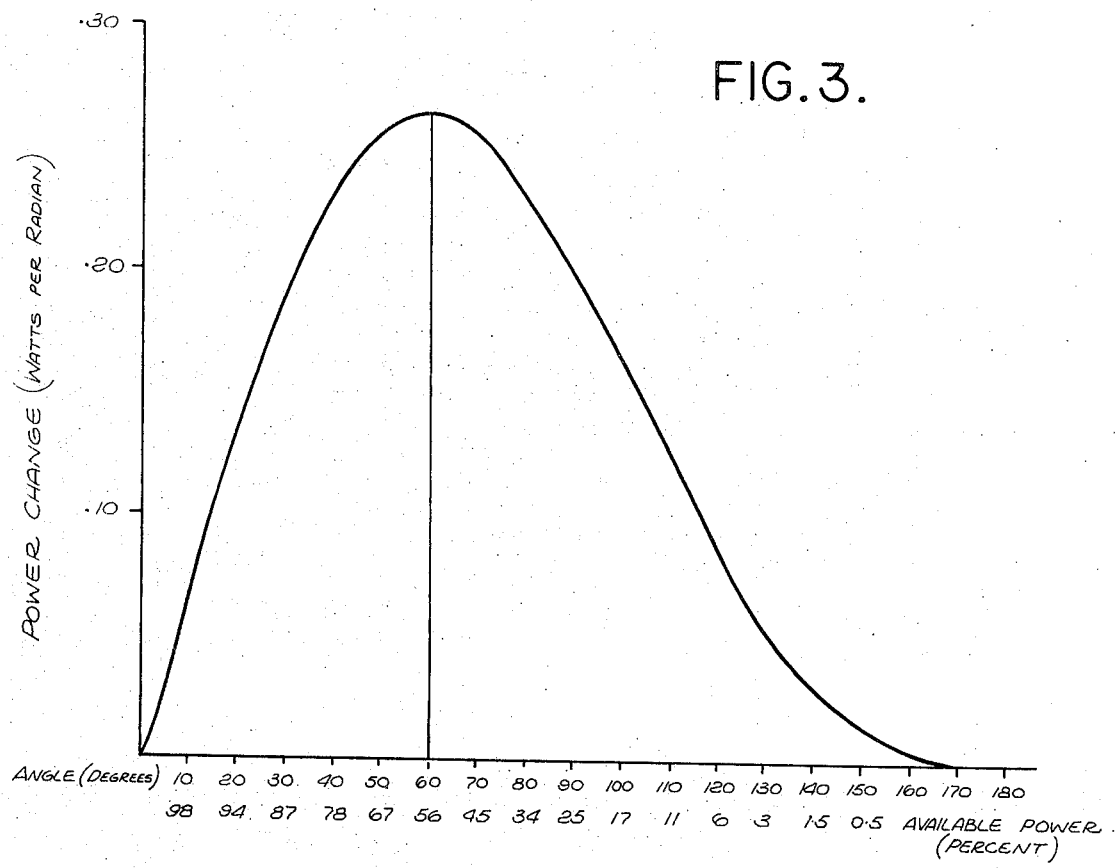
FIG. 3 is a graph illustrating power distribution in the circuit of FIG. 1.

As shown in the power distribution curve of FIG. 3, as the firing angle of the first load SCR 74 is varied, the amount of power in the resistor 72 is varied. The remaining power across the terminals 32 and 34 is then applied to the second load resistor 82. Thus, should the first load SCR 74 conduct with a 30° delay, 87% of the power for a cycle is applied to the first load resistor 72. The remaining power, i.e., 13% is applied to the second load resistor 82.

The circuit of FIG. 1 was built utilizing the following values:

| CIRCUIT ELEMENT | VALUE |
| --- | --- |
| Capacitor 44 | .1µF |
| Capacitor 48 | .02µF |
| Resistor 42 | look Variable |
| Resistor 46 | 4.7K |
| Diac 52 | 1N5160 |
| SCR 16 | 2N4442 |
| SCR 18 | 2N4442 |
| Diode 22 | 1N4004 |
| Diode 24 | 1N4004 |
| Transformer 56 | BPMC 4210-1638,1:1,300,µH |
| Capacitor 94 | .068µF |
| Resistor 92 | 2M Variable |
| Diac 96 | GEST4 |
| SCR 74 | 2N4442 |
| Resistance 72 | 300W/120V Incandescent lamp |
| Diode 122 | 1N4001 |
| Resistor 124 | 43K |
| Capacitor 126 | .39µF |
| Capacitor 128 | .39µF |
| Resistor 132 | 18K |
| Resistor 142 | 390K |
| Resistor 138 | 620K |
| Diode 144 | 1N4004 |
| Transistor 134 | 2N3638 |
| Diode 148 | 1N4001 |
| Resistor 102 | 12K/2W |
| Capacitor 104 | .1µF |
| Diac 106 | GEST4 |
| SCR 84 | 2N4442 |
| Resistance 82 | 300W/120V Incandescent lamp |

I claim:

1. A power control system comprising: a range power control means; and a power distribution control circuit cascaded with said range power control means for distributing power which is equal to a predetermined value from said range power control means through a plurality of loads said power distribution control circuit comprising an independent section and a dependent section, each having a load, and wherein changes in power output of said independent section load in turn varies the power output of said dependent section resulting in a constant power distribution between said loads.

2. A power control system in accordance with claim 1 wherein said power distribution control circuit independent section and dependent section are interconnected by means of a delay network for controlling the amount of power output of the dependent section.

3. A power control system in accordance with claim 2 wherein said delay network is formed of a differentiating circuit and integrating network.

* * * * *